(12) United States Patent
Kim et al.

(10) Patent No.: US 10,947,879 B2
(45) Date of Patent: Mar. 16, 2021

(54) EXHAUST HEAT RECOVERY SYSTEM

(71) Applicants: Hyundai Motor Company, Seoul (KR); Kia Motors Corporation, Seoul (KR)

(72) Inventors: Min Jae Kim, Mungyeong-si (KR); Seung Tae Kong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/653,660

(22) Filed: Oct. 15, 2019

(65) Prior Publication Data

US 2020/0378285 A1 Dec. 3, 2020

(30) Foreign Application Priority Data

May 27, 2019 (KR) .................. 10-2019-0062187

(51) Int. Cl.
*F01N 1/04* (2006.01)
*F01N 1/16* (2006.01)
*F01N 3/02* (2006.01)
*F01N 3/04* (2006.01)
*F01N 5/02* (2006.01)
*F02G 5/02* (2006.01)
*F01P 3/12* (2006.01)
*F16K 31/00* (2006.01)

(52) U.S. Cl.
CPC ............. *F01N 3/043* (2013.01); *F01N 1/04* (2013.01); *F01N 1/163* (2013.01); *F01N 1/166* (2013.01); *F01N 3/0205* (2013.01); *F01N 5/02* (2013.01); *F01P 3/12* (2013.01); *F02G 5/02* (2013.01); *F16K 31/002* (2013.01); *F01N 2310/02* (2013.01)

(58) Field of Classification Search
CPC . F01N 1/04; F01N 1/163; F01N 1/166; F01N 3/0205; F01N 3/043; F01N 5/02; F02G 5/02

See application file for complete search history.

(56) References Cited

U.S. PATENT DOCUMENTS

2016/0169075 A1* 6/2016 Dobryden ............... B60H 1/20 165/138
2017/0335741 A1* 11/2017 Kruger ..................... F01N 5/02

FOREIGN PATENT DOCUMENTS

| DE | 102012104396 A1 * 11/2013 ............... F01N 5/02 |
| JP | 2007113559 A   *  5/2007 |
| KR | 10-1509812 B1     4/2015 |

* cited by examiner

*Primary Examiner* — Audrey K Bradley
(74) *Attorney, Agent, or Firm* — Morgan, Lewis & Bockius LLP

(57) ABSTRACT

An exhaust heat recovery system may include a muffler including a muffler case, a pipe through which exhaust gas flows, a baffle partitioning an internal space of the muffler case into a first space and a second space, and a valve mounted on an end portion of the pipe to change a direction in which the exhaust gas flows, and a heat exchanger mounted outside the muffler to fluidically-communicate with both the first and second spaces, allowing the exhaust gas to be introduced thereinto and to be discharged therefrom, the heat exchanger including a cooling channel through which cooling water flows, and heat exchange between the exhaust gas and the cooling water being performed in the heat exchanger.

16 Claims, 7 Drawing Sheets

EXHAUST HEAT RECOVERY SYSTEM

CROSS-REFERENCE TO RELATED APPLICATION

The present application claims priority to Korean Patent Application No. 10-2019-0062187, filed on May 27, 2019 in the Korean Intellectual Property Office, the entire contents of which is incorporated herein for all purposes by this reference.

BACKGROUND OF THE INVENTION

Field of the Invention

The present invention relates to an exhaust heat recovery system.

Description of Related Art

To utilize exhaust gas, an exhaust heat recovery apparatus is typically provided at an exhaust system to efficiently utilize the high thermal energy of the exhaust gas.

Such an exhaust heat recovery apparatus is designed to take cooling water and oil from an engine or transmission and to perform heat exchange between the cooling water and oil and exhaust gas to obtain improvement in heating performance of a vehicle and reduction in oil friction, offering an effect of improving fuel efficiency of the vehicle.

Technologies relating to an exhaust heat recovery apparatus have been actively developed heretofore. However, conventional exhaust heat recovery apparatuses, which are intended to be additionally provided at a muffler, have a disadvantage in that it is difficult to apply the apparatus to recent vehicles, which are being made compact. Furthermore, because conventional exhaust heat recovery apparatuses have sufficient performance of heat exchange but are seriously deteriorated in performance of thermal insulation, there is also a problem whereby cooling water is overheated, thus adversely affecting fuel efficiency or the like.

Accordingly, there is a need to develop a technology for improving performance in heat exchange and thermal insulation and for recovering exhaust heat using an apparatus having a simple structure.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an exhaust heat recovery system having a compact structure configured for improving performance in heat exchange and thermal insulation.

In accordance with various aspects of the present invention, the above and other objects may be accomplished by the provision of an exhaust heat recovery system including a muffler including a muffler case, a pipe through which exhaust gas flows, a baffle partitioning an internal space of the muffler case into a first space and a second space, and a valve mounted on an end portion of the pipe to change a direction in which the exhaust gas flows, and a heat exchanger mounted outside the muffler to fluidically-communicate with both the first and second spaces, allowing the exhaust gas to be introduced thereinto and to be discharged therefrom, the heat exchanger including a cooling channel through which cooling water flows, and heat exchange between the exhaust gas and the cooling water being performed in the heat exchanger.

The other end portion of the pipe may extend through the baffle to be exposed to the second space, and the valve may be mounted to the remaining end portion of the pipe.

The heat exchanger may include an exhaust gas channel, the exhaust gas channel fluidically-communicating with both the first and second spaces.

The exhaust gas channel and the cooling channel may be configured to be alternately stacked.

The exhaust gas channel may be linearly formed.

The exhaust gas channel and the cooling channel may be mounted parallel to each other and may extend in a longitudinal direction of the heat exchanger.

The valve may be opened when a pressure of the exhaust gas in the pipe is equal to or greater than a predetermined pressure.

The exhaust heat recovery system may further include a valve-opening and closing unit mounted outside the muffler and connected to the valve to selectively open the valve, and a valve-opening and closing-drive unit mounted outside the muffler, the valve-opening and closing-drive unit operating the valve-opening and closing unit to change a direction in which the exhaust gas flows.

The valve-opening and closing-drive unit may include a case portion connected at an end portion thereof to a cooling-water-introduction pipe and including therein a material which is configured to expand or contract depending on temperature of the internal space, the cooling water being introduced into the case portion from the cooling-water-introduction pipe, and the case portion having a cylindrical shape, and an elastic body mounted in the case portion between a remaining end portion of the case portion and the valve-opening and closing unit, the elastic body being expanded or compressed to move the valve-opening and closing-drive unit when the material contracts or expands depending on the temperature of the cooling water.

The exhaust heat recovery system may further include a cooling-water-connection pipe mounted outside the muffler to connect the case portion to the cooling channel in the heat exchanger.

The cooling-water-introduction pipe may be concentrically and integrally formed with the case portion.

The cooling channel may be configured to have a "U" shape.

The exhaust heat recovery system may further include a cooling-water-discharge pipe from which the cooling water that has circulated through the cooling channel in the heat exchanger is discharged.

The first space may be a sound-absorbing space and may be filled with a sound-absorbing material, and the second space may be an expansion space.

The heat exchanger may be spaced from the muffler with a predetermined distance.

The muffler and the heat exchanger may be connected to each other via a half wavelength pipe.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
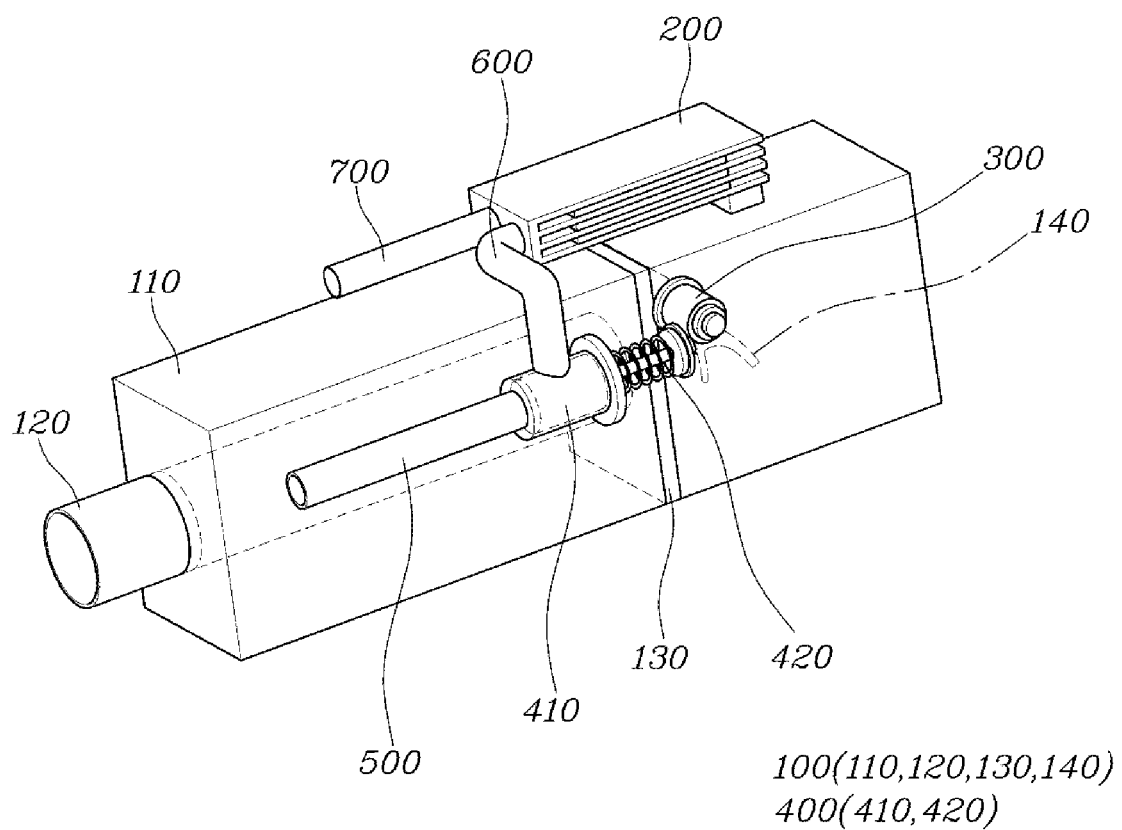
FIG. 1 is a perspective view of the exhaust heat recovery system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an exhaust heat recovery system according to an exemplary embodiment of the present invention will be described with reference to the accompanying drawings.

Figure 2:
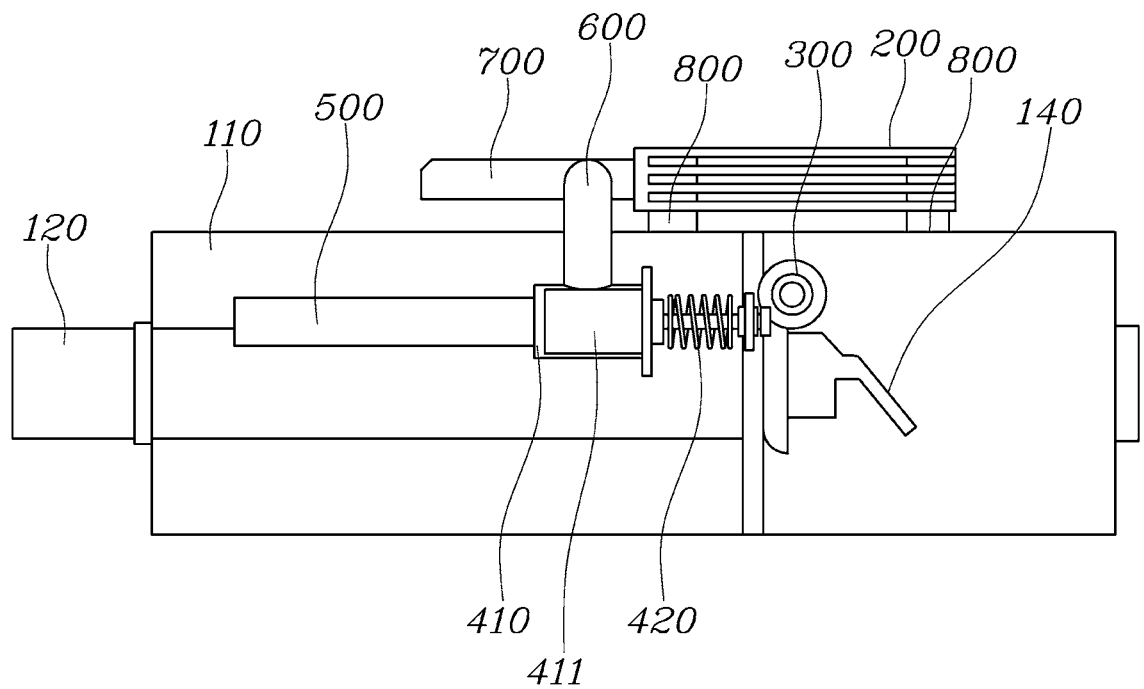
FIG. 2 is a side view of the exhaust heat recovery system according to an exemplary embodiment of the present invention.
Figure 3:
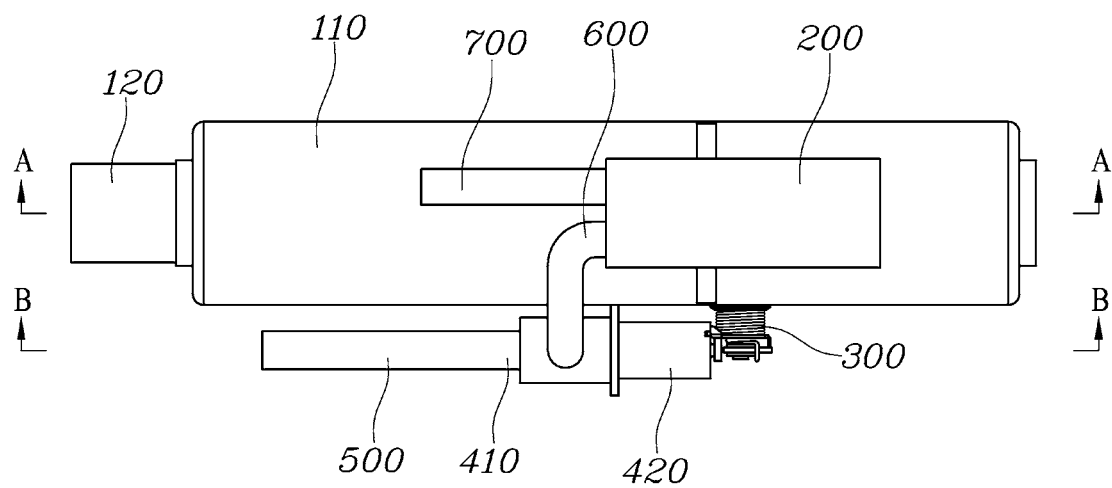
FIG. 3 is a plan view of the exhaust heat recovery system according to an exemplary embodiment of the present invention.
Figure 4:
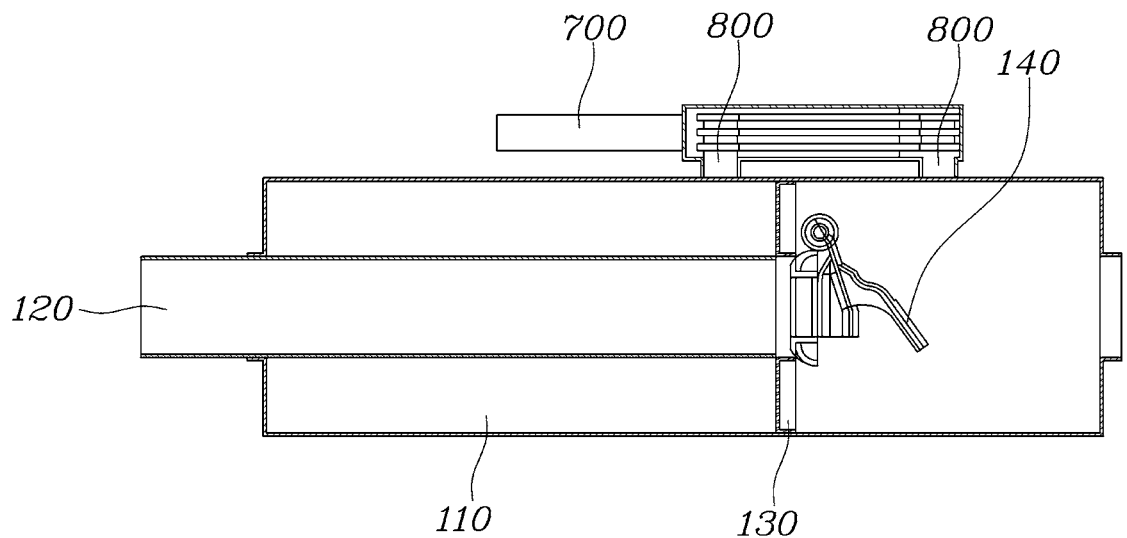
FIG. 4 is a cross-sectional view taken along line A-A' in FIG. 3.
Figure 5:
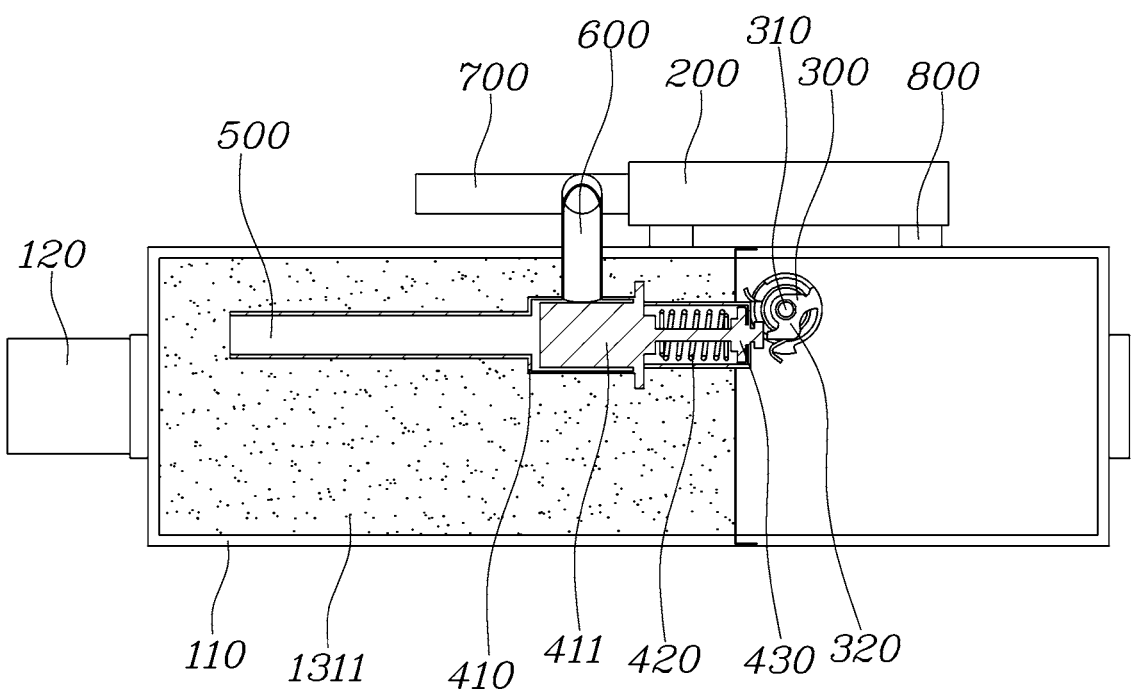
FIG. 5 is a cross-sectional view taken along line B-B' in FIG. 3.
Figure 6:
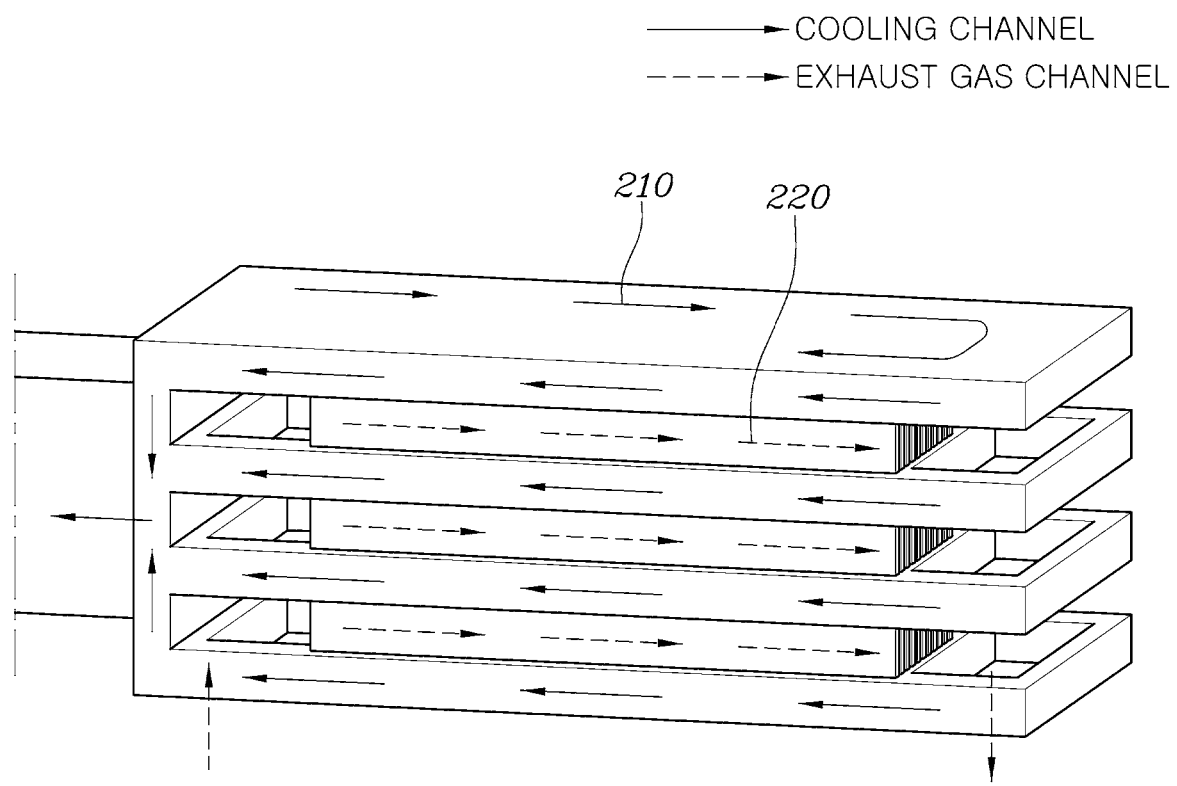
FIG. 6 is a view exemplarily illustrating the internal structure of a heat exchanger of the exhaust heat recovery system according to an exemplary embodiment of the present invention.
Figure 7:
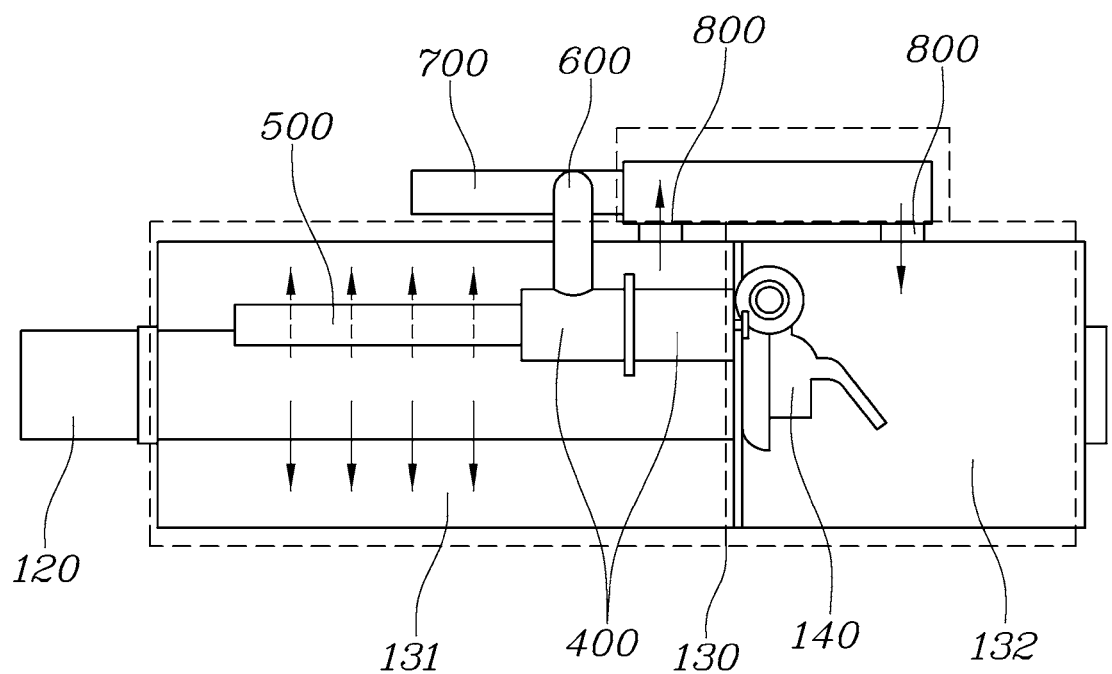
FIG. 7 is a view exemplarily illustrating the flow of exhaust heat in the state in which a valve is closed because a temperature of cooling water is lower than a predetermined temperature or a pressure of exhaust gas is lower than a predetermined pressure.
Figure 8:
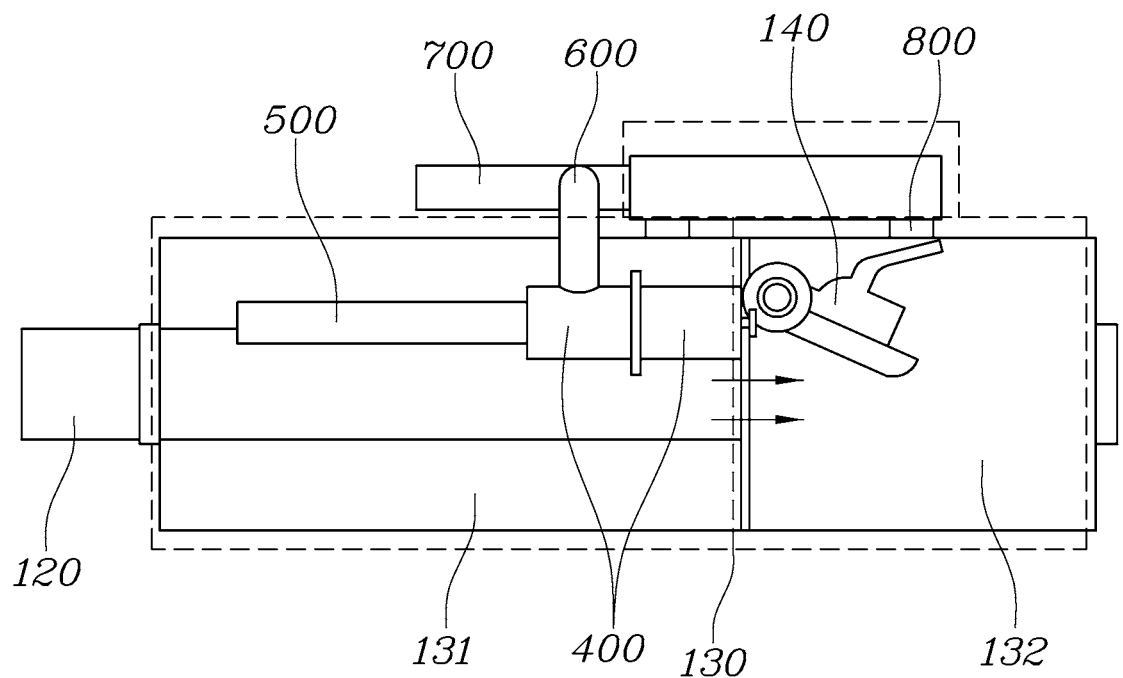
FIG. 8 is a view exemplarily illustrating the flow of exhaust heat in the state in which a valve is configured to be opened because a temperature of cooling water is higher than a predetermined temperature or a pressure of exhaust gas is higher than a predetermined pressure.
Figure 9:
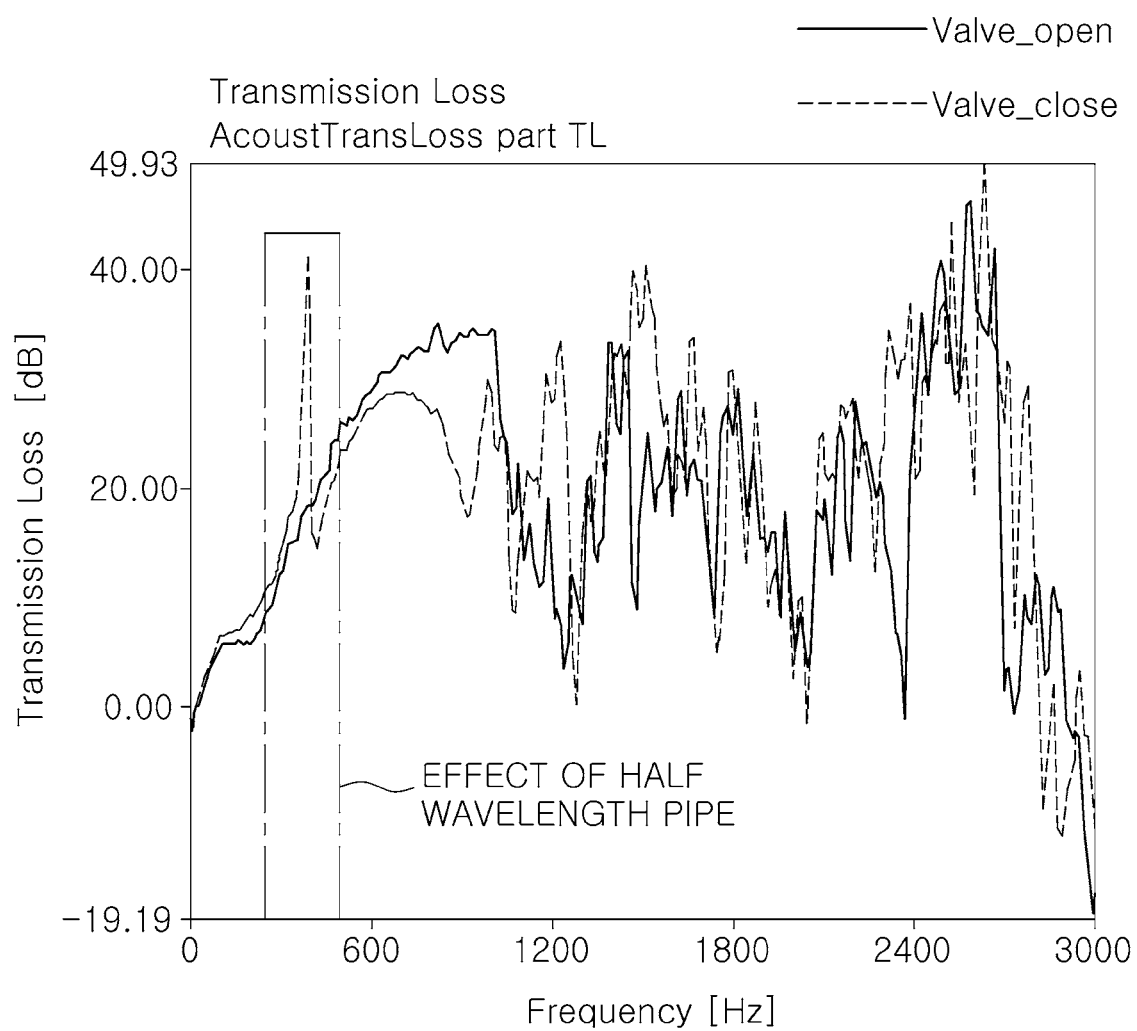
FIG. 9 is a view exemplarily illustrating an effect of reducing noise by a half-wavelength pipe in the exhaust heat recovery system according to an exemplary embodiment of the present invention.

FIG. 1 is a perspective view of the exhaust heat recovery system according to an exemplary embodiment of the present invention. FIG. 2 is a side view of the exhaust heat recovery system according to an exemplary embodiment of the present invention. FIG. 3 is a plan view of the exhaust heat recovery system according to an exemplary embodiment of the present invention. FIG. 4 is a cross-sectional view taken along line A-A' in FIG. 3. FIG. 5 is a cross-sectional view taken along line B-B' in FIG. 3. FIG. 6 is a view exemplarily illustrating the internal structure of a heat exchanger of the exhaust heat recovery system according to an exemplary embodiment of the present invention. FIG. 7 is a view exemplarily illustrating the flow of exhaust heat in the state in which a valve is closed because a temperature of cooling water is lower than a predetermined temperature or a pressure of exhaust gas is lower than a predetermined pressure. FIG. 8 is a view exemplarily illustrating the flow of exhaust heat in the state in which a valve is configured to be opened because a temperature of cooling water is higher than a predetermined temperature or a pressure of exhaust gas is higher than a predetermined pressure. FIG. 9 is a view exemplarily illustrating an effect of reducing noise by a ½ half-wavelength pipe in the exhaust heat recovery system according to an exemplary embodiment of the present invention.

Although not illustrated in the drawings, the exhaust heat recovery system according to an exemplary embodiment of the present invention is a system configured for improving fuel efficiency of a vehicle by exchanging heat of cooling water in a cooling device of an automotive engine with heat of exhaust gas discharged from the automotive engine.

Referring to FIGS. 1 to 6, the exhaust heat recovery system according to an exemplary embodiment of the present invention may include a muffler 100 and a heat exchanger 200 mounted outside the muffler 100.

The muffler 100 may include a muffler case 110, a pipe 120 through which exhaust gas flows, a baffle 130 partitioning the internal space in the muffler case 110 into a first space 131 and a second space 132, and a valve 140 mounted on an end portion of the pipe to change the direction in which the exhaust gas flows. Here, the other end portion of the pipe 120 may extend through the baffle 130 to be exposed to the second space 132. The valve 140 may be mounted on the other end portion of the pipe 120.

The muffler case 110 may support the pipe 120, and the baffle 130 may support the muffler case 110. The exhaust gas discharged from the engine may flow through the pipe 120.

According to the exemplary embodiment of the present invention, the first space 131, which is partitioned by the baffle 130, may be a sound-absorbing space, and the second space 132 may be an expanded space. As illustrated in FIG. 5, the first space 131 may be filled with a sound-absorbing material 1311. Although the sound-absorbing material 1311 may be glass wool according to the exemplary embodiment of the present invention, the sound-absorbing material is merely an example, and the first space 131 may be filled with another sound-absorbing material. The muffler 100, which includes the first space 131 and the second space 132 that are partitioned by the baffle 130, may be of a sound-absorbing expansion type.

According to the exemplary embodiment of the present invention, the valve 140 may be opened when the pressure of exhaust gas in the pipe 120 is equal to or greater than a predetermined pressure. In other words, the valve 140 may remain closed when the pressure of exhaust gas in the pipe 120 is lower than the predetermined pressure, and may be opened when the pressure of exhaust gas in the pipe 120 is equal to or greater than the predetermined pressure. Here, the predetermined pressure of the exhaust gas, at which the valve 140 is opened or closed, may be changed depending on the specifications of the valve 140.

Furthermore, the valve 140 may be opened or closed by a valve-opening and closing-drive unit 400, which will be described later. The opening and closing of the valve 140 will be described in detail later.

The heat exchanger 200 may be mounted outside the muffler 100, and may preferably be spaced from the muffler 100 with a predetermined distance. An exhaust heat recovery system for improving fuel efficiency by recovering heat of exhaust gas has an advantage of being configured for reducing frictional loss upon cold-starting and of supplying heat required to start an air conditioner. However, when heat exchange is performed between exhaust gas and cooling water after sufficient warm-up is implemented, there is a problem in that the cooling water is overheated, adversely affecting fuel efficiency. According to an exemplary embodiment of the present invention, to solve the above problem, the heat exchanger 200 may be mounted outside the muffler 100 to be spaced from the muffler 100 with a predetermined distance, improving performance of thermal insulation.

The heat exchanger 200 may fluidically-communicate with both the first space 131 and the second space 132 in the muffler 100 to allow exhaust gas to be introduced thereinto and discharged therefrom. As illustrated in FIGS. 7 and 8, the heat exchanger 200 and the muffler 100 may be connected to each other via the half wavelength pipe 800. According to an exemplary embodiment of the present invention, since the heat exchanger 200 and the muffler 100 are connected to each other via the half wavelength pipe 800, it is possible to further improve efficiency in noise reduction of exhaust gas, as illustrated in FIG. 9.

The heat exchanger 200 may include an exhaust gas channel 220 through which exhaust air flows, as illustrated in FIG. 6. The exhaust gas channel 220 may fluidically-communicate with both the first space 131 and the second space 132 in the muffler 100 such that the exhaust gas in the pipe flows from the first space 131 to the second space 132 through the heat exchanger 200, as illustrated in FIG. 7.

Furthermore, the heat exchanger 200 may include a cooling channel 210 through which cooling water flows, as illustrated in FIG. 6. The cooling channel 210 may be configured to have a "U" shape such that a portion through which cooling water is input and a portion through which the cooling water is output are positioned at the same side thereof. The cooling water may be the cooling water which is introduced from an engine cooler. The exhaust gas, which flows through the exhaust gas channel 220, and the cooling water, which flows through the cooling channel 210, may exchange heat with each other in the heat exchanger 200.

The cooling channel 210 and the exhaust gas channel 220 in the heat exchanger 200 may be configured to have an alternately stacked structure. The exhaust gas channel 220 may be linearly formed. The cooling channel 210 and the exhaust gas channel 220 are mounted parallel to each other and extend in a longitudinal direction thereof. As mentioned above, since the exhaust gas channel 220 in the heat exchanger 200 is linearly formed, it is possible to minimize the flow resistance of exhaust gas. Furthermore, since the cooling channel 210 and the exhaust air channel 220 are alternately stacked to be mounted parallel to each other and extend in the longitudinal direction of the heat exchanger 200, it is possible to maximize the contact area in which the exhaust gas and the cooling water exchange heat with each other, and thus it is possible to fulfill optimal heat exchange between the exhaust gas and the cooling water.

The exhaust heat recovery system according to an exemplary embodiment of the present invention may further include a valve-opening and closing unit 300, the valve-opening and closing-drive unit 400, a cooling-water-introduction pipe 500, a cooling-water-connection pipe 600 and a cooling-water-discharge pipe 700.

The valve-opening and closing unit 300 may be mounted outside the muffler 100, and may be connected to the valve 140 to open or close the valve 140. The valve-opening and closing unit 300 may be operated to open or close the valve 140 by activation of the valve-opening and closing-drive unit 400.

The valve-opening and closing-drive unit 400 is illustrated in FIGS. 2 and 5.

The valve-opening and closing-drive unit 400 may be mounted outside the muffler 100, and may operate the valve-opening and closing unit 300 to change the direction in which the exhaust gas flows, referring to FIGS. 2 and 5, the valve-opening and closing-drive unit 400 may include a case portion 410 and an elastic body 420.

As illustrated in FIGS. 2 and 5, according to the exemplary embodiment of the present invention, the case portion 410 may be configured to have a cylindrical shape, and may be connected at an end portion thereof to the cooling-water-introduction pipe 500, into which the cooling water is introduced. According to the exemplary embodiment of the present invention, the cooling-water-introduction pipe 500 may be concentrically and integrally formed with the case portion 410. According to an exemplary embodiment of the present invention, since the cooling-water-introduction pipe 500 and the case portion 410 are integrally and linearly formed with each other, it is possible to make the entire structure compact.

The case portion 410 may include a material 411, which expands or contracts depending on the temperature of the internal space. The material 411 which is contained in the case portion 410 may expand or contract depending on the temperature of the cooling water which is introduced into the case portion 410 through the cooling-water-introduction pipe 500.

As illustrated in FIGS. 2 and 5, the elastic body 420 may be positioned between the other end portion of the case portion 410 and the valve-opening and closing unit 300. As the material 411 contained in the case portion 410 expands or contracts depending on the temperature of the cooling water introduced into the case portion 410, the elastic body 420 may be expanded or compressed, permitting the valve-opening and closing-drive unit 400 to be moved. According to the exemplary embodiment of the present invention, the elastic body 420 may be a spring. However, this is merely an example. The elastic body 420 according to an exemplary embodiment of the present invention may be embodied as any member other than the spring, as long as the member is configured to be expanded or compressed by contraction or expansion of the material 411 contained in the case portion 410.

Referring to FIGS. 5, 7 and 8, according to the exemplary embodiment of the present invention, when the temperature of the cooling water in the case portion 410 is equal to or greater than a predetermined temperature, the material 411 contained in the case portion 410 expands, and the other end portion of the case portion 410 is moved rightwards, compressing the elastic body 420. As a result, the valve-opening and closing-drive unit 400 is operated due to the elastic force of the elastic body 420, opening the valve 140. Meanwhile, when the temperature of the cooling water in the case portion 410 is lower than the predetermined temperature, the material 411 contained in the case portion 410 contracts, and thus the other end portion of the case portion 410 is moved leftwards, restoring the elastic body 420. As a result, the driving force required for the valve-opening and closing-drive unit 400 to operate the valve 140 is released, closing the valve 140.

When the temperature of the cooling water which is introduced into the case portion 410 is lower than the predetermined temperature or the pressure of the exhaust gas in the pipe 120 is lower than the predetermined pressure, the valve 140 may be in the closed state, as illustrated in FIG. 7. At the instant time, the exhaust gas flows through the first space 131, the half wavelength pipe 800, the heat exchanger 200 and the second space 132 in the present order, offering an effect of reducing noise.

In an exemplary embodiment of the present invention, the first space 131 of the muffler 100 and the heat exchanger 200 are connected to each other via a first half wavelength pipe 800 and the second space 132 of the muffler 100 and the heat exchanger 200 are connected to each other via a second half wavelength pipe 800, as shown in FIG. 7.

Meanwhile, when the temperature of the cooling water which is introduced into the case portion 410 is equal to or greater than the predetermined temperature or the pressure of the exhaust gas in the pipe 140 is equal to or greater than the predetermined pressure, the valve 140 may be in the open state, as illustrated in FIG. 8. At the instant time, the exhaust gas flows from the first space 131 to the second space 132, offering an effect of reducing noise.

As illustrated in FIGS. 1, 2 and 5, the cooling-water-connection pipe 600 may be mounted outside the muffler 100 to be configured to connect the case portion 410 to the cooling channel 210 in the heat exchanger 200. In other words, the cooling water which is introduced into the case portion 410 through the cooling-water-introduction pipe 500 may be introduced into the cooling channel 210 in the heat exchanger 200 through the cooling-water-connection pipe 600.

The cooling-water-discharge pipe 700 may discharge the cooling water that has circulated through the cooling channel 210 in the heat exchanger 200.

In an exemplary embodiment of the presently invention, the valve-opening and closing unit 300 may include a hinge 320 and a lever 320 connected to the hinge 320 to pivotally connect the valve 140 to the muffler 100 and the valve-opening and closing-drive unit 400 may further include a plunger 430 connected to the material 411 and the elastic body 420 is mounted between the plunger 430 and the material 411 such that when the material 411 expands, the material 411 pushes the plunger 430 and then the plunger 430 pushes the lever 320 so as to open the valve 140.

As described above, the exhaust heat recovery system according to an exemplary embodiment of the present invention is configured to improve performance in heat exchange and thermal insulation by the compact structure owing to the above-described construction.

As is apparent from the above description, various aspects of the present invention are directed to providing an exhaust heat recovery system configured for improving performance in heat exchange and thermal insulation and of making the structure compact.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An exhaust heat recovery system comprising:
    a muffler including a muffler case, a pipe through which exhaust gas flows, a baffle partitioning an internal space of the muffler case into a first space and a second space, and a valve mounted on an end portion of the pipe to change a direction in which the exhaust gas flows; and
    a heat exchanger mounted outside the muffler to fluidically-communicate with the first and second spaces, to allow the exhaust gas to be introduced into the heat exchanger and to be discharged from the heat exchanger,
    wherein the heat exchanger includes a cooling channel through which cooling water flows, so that heat between the exhaust gas and the cooling water is exchanged in the heat exchanger,
    wherein the exhaust heat recovery system further includes:
        a valve-opening and closing unit mounted outside the muffler and connected to the valve to selectively open the valve; and
        a valve-opening and closing-drive unit mounted outside the muffler and configured to operate the valve-opening and closing unit to change a direction in which the exhaust gas flows, and
    wherein the valve-opening and closing-drive unit includes:
        a case portion, a first end portion of which is connected to a cooling-water-introduction pipe, wherein the case portion includes a material configured to expand or contract depending on temperature, and wherein the cooling water is introduced into the case portion from the cooling-water-introduction pipe; and
        an elastic body mounted in the case portion between a second end portion of the case portion and the valve-opening and closing unit and elastically supporting the material of the case portion, wherein the elastic body is configured to be expanded or compressed to selectively move the valve when the material contracts or expands depending on temperature of the cooling water.

2. The exhaust heat recovery system according to claim 1, wherein the end portion of the pipe extends through the baffle to be exposed to the second space in the muffler, and the valve is mounted to the end portion of the pipe in the muffler.

3. The exhaust heat recovery system according to claim 1, wherein the heat exchanger further includes an exhaust gas channel fluidically-communicating with the first and second spaces.

4. The exhaust heat recovery system according to claim 3, wherein the exhaust gas channel and the cooling channel are alternately stacked in the heat exchanger.

5. The exhaust heat recovery system according to claim 3, wherein the exhaust gas channel is linearly formed.

6. The exhaust heat recovery system according to claim 3, wherein the exhaust gas channel and the cooling channel are mounted parallel to each other and extend in a longitudinal direction of the heat exchanger.

7. The exhaust heat recovery system according to claim 1, wherein the valve is configured to be opened in a response that a pressure of the exhaust gas in the pipe is equal to or greater than a predetermined pressure.

8. The exhaust heat recovery system according to claim 1, wherein the valve-opening and closing unit includes a hinge pivotally mounted on the muffler and a lever connected to the hinge, and
wherein the valve-opening and closing-drive unit further includes a plunger connected to the material and the elastic body is mounted between the plunger and the material such that when the material expands, the material pushes the plunger and then the plunger pushes the lever so as to open the valve.

9. The exhaust heat recovery system according to claim 1, further including a cooling-water-connection pipe mounted outside the muffler and connecting the case portion to the cooling channel in the heat exchanger.

10. The exhaust heat recovery system according to claim 1, wherein the cooling-water-introduction pipe is concentrically and integrally formed with the case portion.

11. The exhaust heat recovery system according to claim 1, wherein the cooling channel has a "U" shape.

12. The exhaust heat recovery system according to claim 1, wherein the heat exchanger further includes a cooling-water-discharge pipe, from which the cooling water that has circulated through the cooling channel in the heat exchanger is discharged outside the heat exchanger.

13. The exhaust heat recovery system according to claim 1, wherein the first space is a sound-absorbing space and is filled with a sound-absorbing material, and the second space is an expansion space for the exhaust gas.

14. The exhaust heat recovery system according to claim 1, wherein the heat exchanger is spaced from the muffler with a predetermined distance.

15. The exhaust heat recovery system according to claim 1, wherein the muffler and the heat exchanger are connected to each other via a half wavelength pipe.

16. The exhaust heat recovery system according to claim 1, wherein the first space of the muffler and the heat exchanger are connected to each other via a first pipe and the second space of the muffler and the heat exchanger are connected to each other via a second pipe.

* * * * *